United States Patent [19]
Okada et al.

[11] Patent Number: 5,898,504
[45] Date of Patent: Apr. 27, 1999

[54] FACSIMILE APPARATUS AND IMAGE COMMUNICATION METHOD FOR THE SAME

[75] Inventors: Naoyuki Okada, Yokohama; Kazuhiro Uruma, Kawasaki, both of Japan

[73] Assignee: Canon Kabushiki Kaisha, Tokyo, Japan

[21] Appl. No.: 08/502,235

[22] Filed: Jul. 13, 1995

Related U.S. Application Data

[63] Continuation of application No. 07/921,333, Jul. 29, 1992, abandoned.

[30] Foreign Application Priority Data

Aug. 1, 1991 [JP] Japan .................................. 3-192946
Jul. 23, 1992 [JP] Japan .................................. 4-197048

[51] Int. Cl.⁶ .......................................................... A04N 1/00
[52] U.S. Cl. ............................................. 358/75; 358/434
[58] Field of Search ................................. 358/500, 501, 358/434, 75

[56] References Cited

U.S. PATENT DOCUMENTS

| 4,739,397 | 4/1988 | Hayashi .................................. 358/80 |
| 4,862,254 | 8/1989 | Takada .................................... 358/75 |
| 5,251,020 | 10/1993 | Sugiyama .............................. 358/500 |
| 5,311,334 | 5/1994 | Sugiura ................................. 358/537 |
| 5,361,143 | 11/1994 | Nakayama ............................. 358/500 |
| 5,361,147 | 11/1994 | Katayama et al. ..................... 358/532 |

FOREIGN PATENT DOCUMENTS

| 0283295 | 9/1988 | European Pat. Off. . |
| 0364264 | 4/1990 | European Pat. Off. . |
| 4034540 | 5/1991 | Germany . |
| 63-084261 | 4/1988 | Japan . |
| 2100573 | 4/1990 | Japan . |
| 2216750 | 10/1989 | United Kingdom . |

*Primary Examiner*—Bernard Roskoski
*Attorney, Agent, or Firm*—Fitzpatrick Cella Harper & Scinto

[57] ABSTRACT

Disclosed in a facsimile apparatus which is capable of transmitting image data representing an image pattern to a color facsimile apparatus, the facsimile apparatus including: a designation device for designating colors in which the image data is reproduced and output on the side of the color facsimile apparatus; a communication controller for preparing communication information indicating the designated colors; and a communication device for transmitting the communication information to the color facsimile apparatus along with the image data.

28 Claims, 12 Drawing Sheets

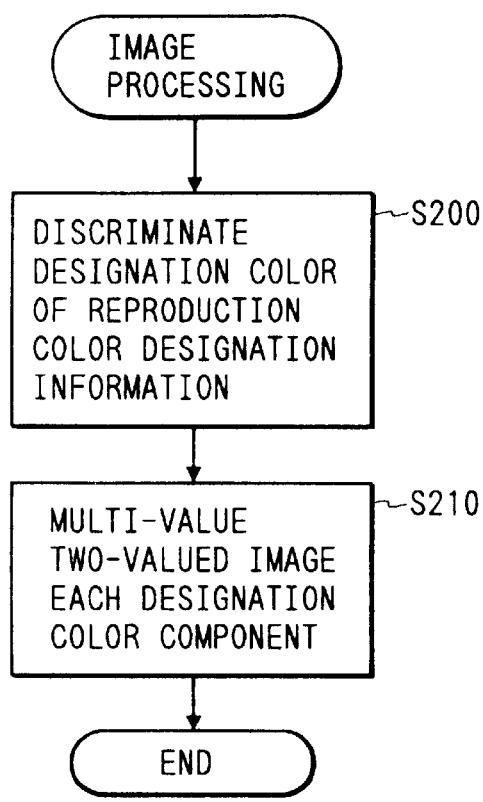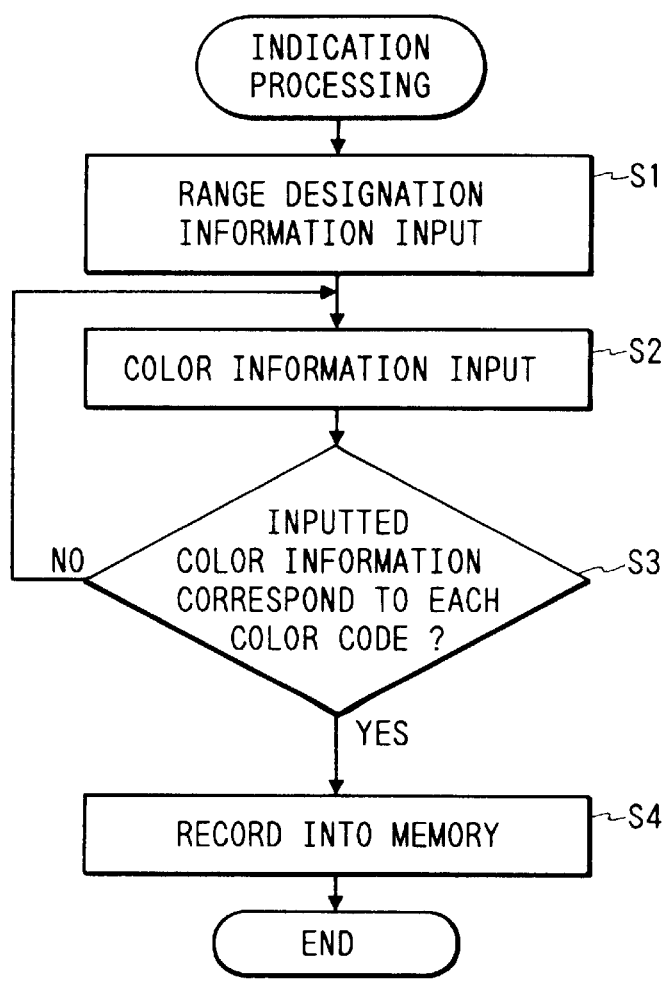

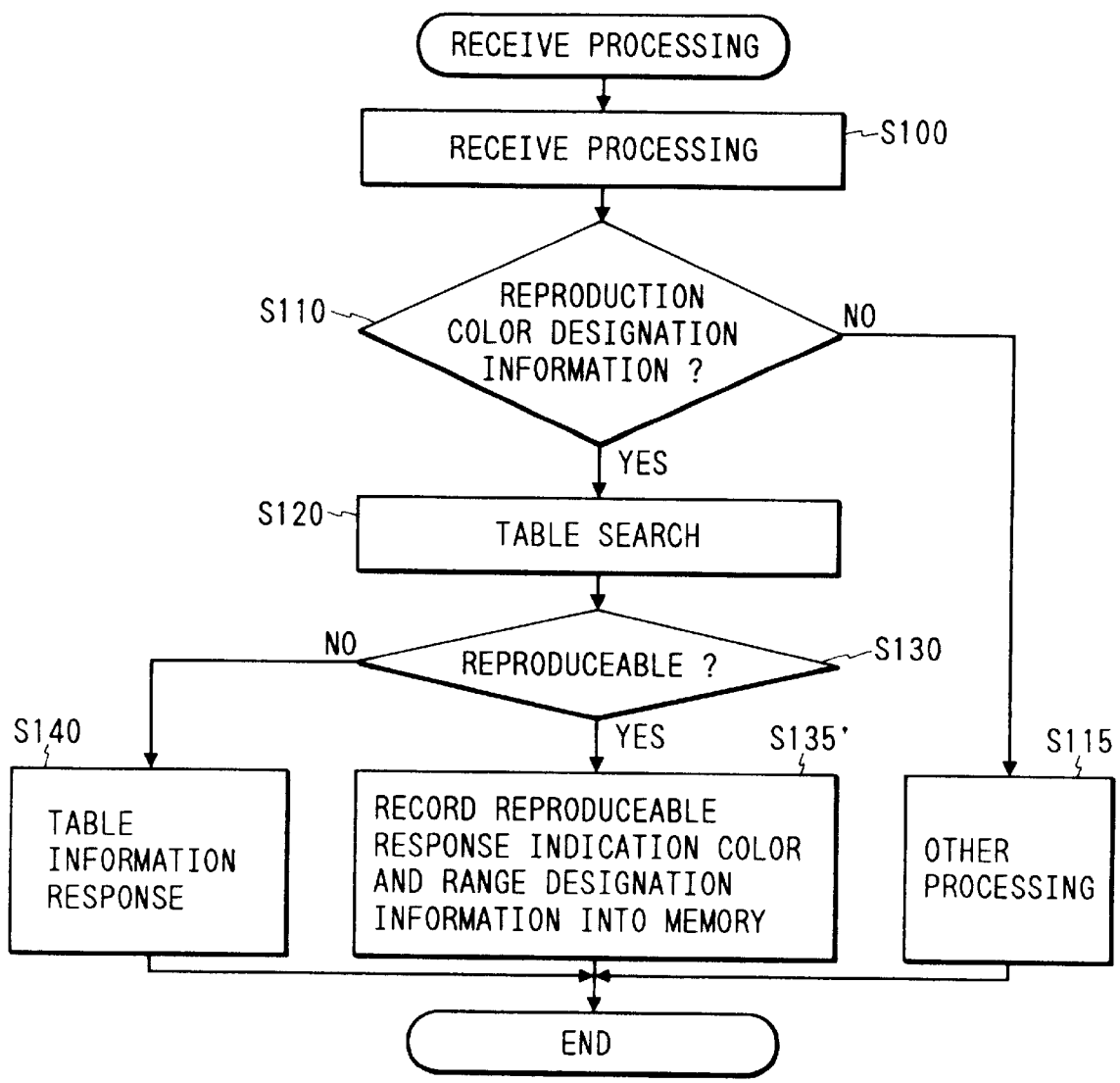

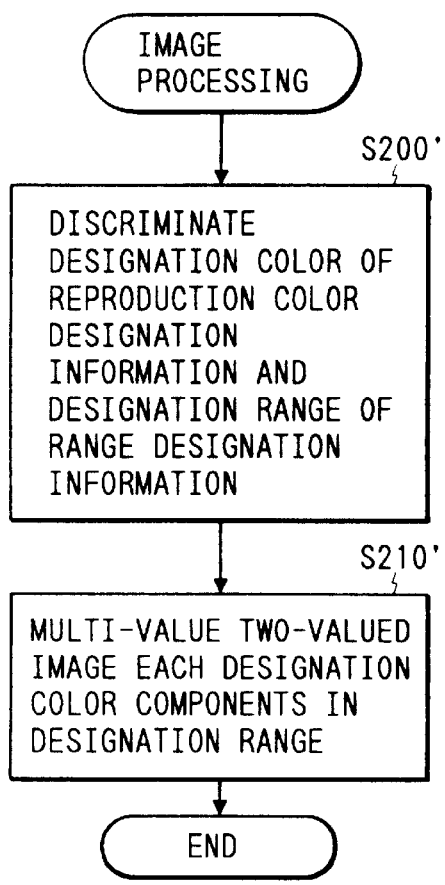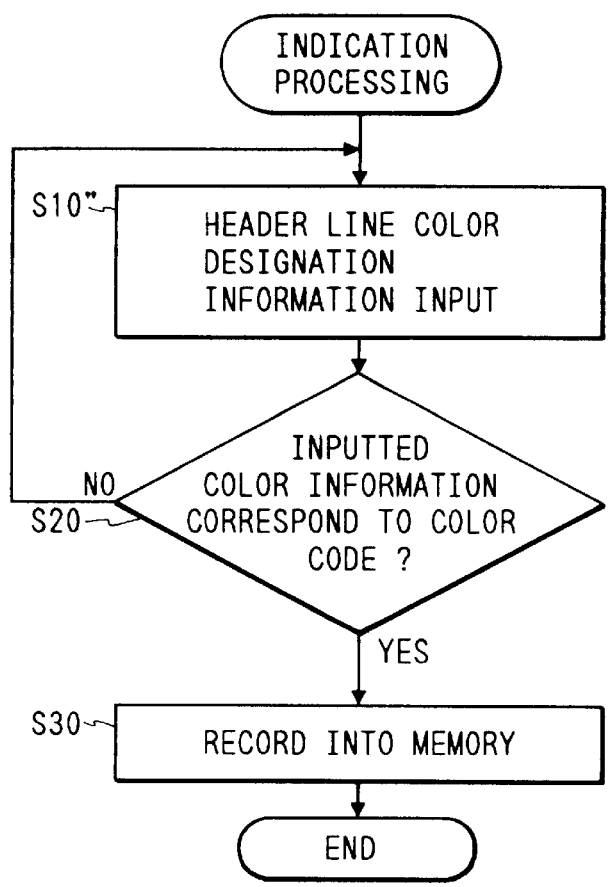

FACSIMILE APPARATUS AND IMAGE COMMUNICATION METHOD FOR THE SAME

This application is a continuation of application Ser. No. 07/921,333 filed Jul. 29, 1992 abandoned.

BACKGROUND OF THE INVENTION

1. Field of the Invention

The present invention relates to a facsimile apparatus and an image communication method for the same.

2. Related Background Art

In facsimile apparatuses belonging to Groups 3 and 4 of CCITT (Comité Consultatif International Télégraphique et Téléphonique (International Telegraph and Telephone Consultative Committee)), black-and-white two-valued image data is transmitted and received.

A problem with these facsimile apparatuses is that they only transmit black-and-white information, even in a case where they transmit to a facsimile apparatus which allows printing in reproduction colors other than black and white.

The assignee of the present invention has filed a patent application for a color facsimile apparatus (U.S. patent application Ser. No. 07/758,799).

SUMMARY OF THE INVENTION

The present invention has been made in view of the above problem. It is an object of the present invention to provide a facsimile apparatus and an image communication method for the same which make it possible to designate reproduction colors on the reception side even with a facsimile apparatus having no function for transmitting a colored original as color image information.

Another object of the present invention is to provide a facsimile apparatus which is capable of receiving, in addition to monochrome image data, colored information on the monochrome image data.

Still another object of the present invention is to provide a facsimile apparatus which is capable of receiving monochrome image data and capable of printing header information, which is to be printed at the head of the monochrome image data, in desired colors.

In accordance with a preferred embodiment of the present invention, there is disclosed a facsimile apparatus which is capable of transmitting image data representing an image pattern to a color facsimile apparatus, the facsimile apparatus comprising: designation means for designating colors in which the image data is reproduced and output on the side of the color facsimile apparatus; communication control means for preparing communication information indicating the designated colors; and communication means for transmitting the communication information to the color facsimile apparatus along with the image data.

A further object of the present invention is to provide a facsimile apparatus having novel functions.

other objects of the present invention will become apparent from the following description of the preferred embodiments taken in connection with the accompanying drawings.

BRIEF DESCRIPTION OF THE DRAWINGS

FIG. 8 is a flowchart illustrating image processing procedures to be executed by a reception-side facsimile apparatus (for two-valued image data) according to the first embodiment of the present invention;

FIG. 9 is a flowchart illustrating range designation and reproduction color designation procedures to be executed by a transmission-side facsimile apparatus (for two-valued image data) according to a second embodiment of the present invention;

FIG. 11 is a flowchart illustrating response procedures to be executed by a reception-side facsimile apparatus (for two-valued image data) according to the second embodiment of the present invention;

FIG. 12 is a flowchart illustrating image processing procedures to be executed by a reception-side facsimile apparatus (for two-valued image data) according to the second embodiment of the present invention;

FIG. 13 is a flowchart illustrating header-line reproduction color designation procedures to be executed by a transmission-side facsimile apparatus (for two-valued image data) according to a third embodiment of the present invention;

DETAILED DESCRIPTION OF THE PREFERRED EMBODIMENTS

Figure 1:
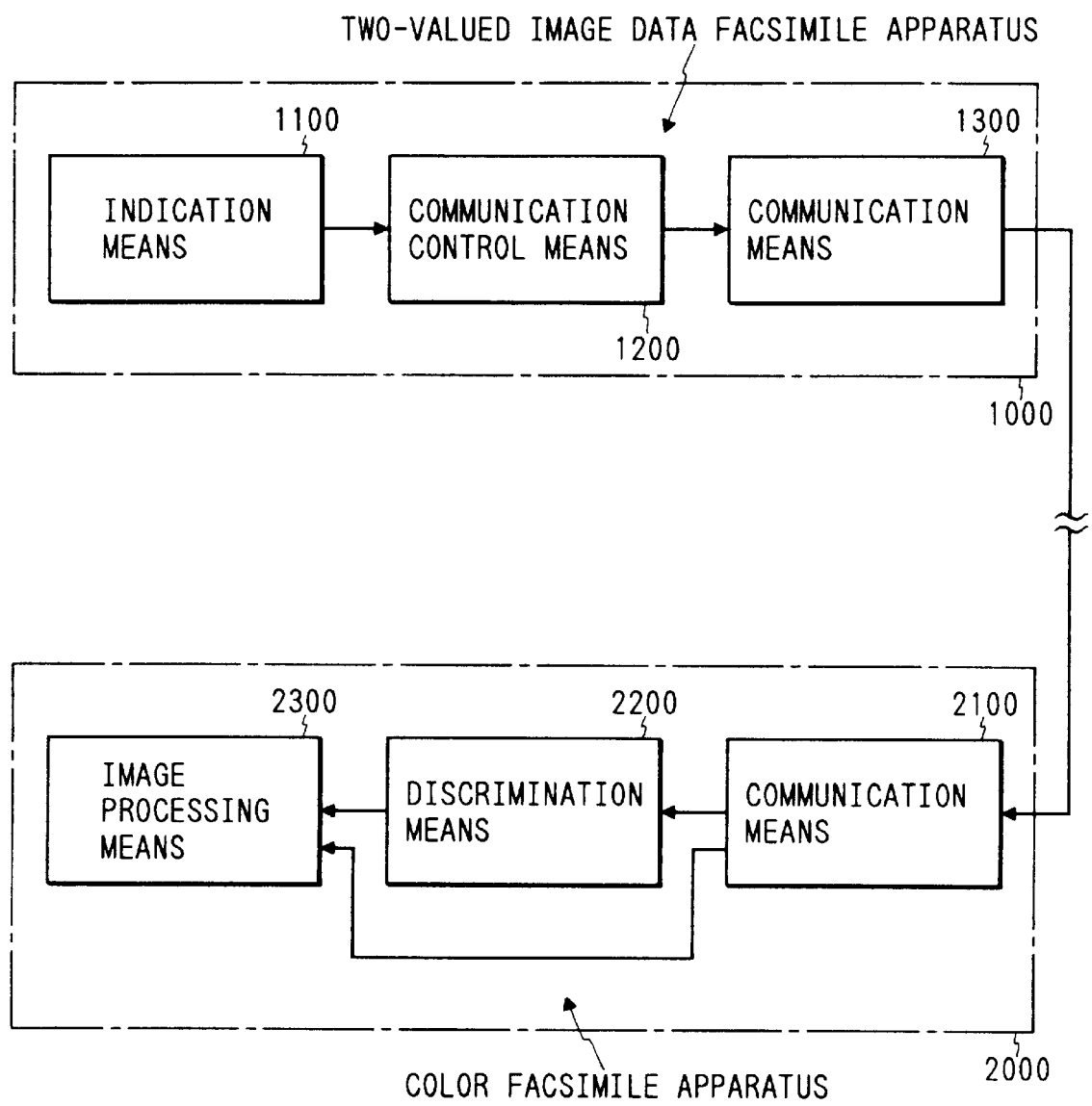
FIG. 1 is a block diagram showing the basic construction of an embodiment of the present invention.

Referring to FIG. 1, numeral 1000 indicates a facsimile apparatus capable of transmitting two-valued image data to a color facsimile apparatus. The facsimile apparatus 1000 comprises: designation means 1100 for designating the colors in which the above two-valued image data is reproduced and output; communication control means 1200 for preparing communication information indicative of the designated colors; and communication means 1300 for transmitting the prepared communication information to the color facsimile apparatus along with the two-valued data.

Numeral 2000 indicates a full-color facsimile apparatus having a communication means 2100 for receiving two-valued image data and capable of reproducing and outputting the image data in predetermined colors. The full-color facsimile apparatus 2000 further comprises: discrimination means 2200 for discriminating the colors of reproduction color information added to the two-valued image data; and image processing means 2300 for converting the received two-valued image data into reproduction-output image data on the discriminated colors.

Figures 2, 3:
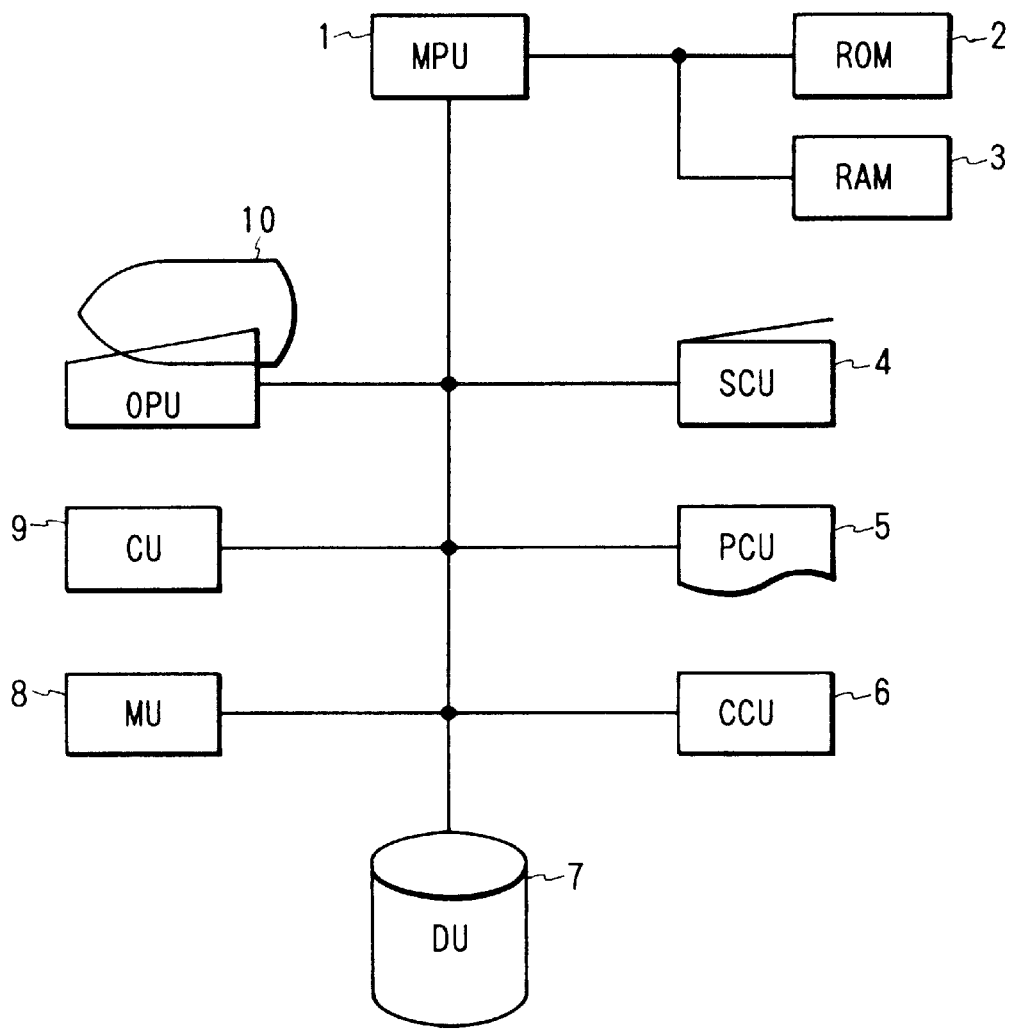
FIG. 2 is a block diagram showing the construction of the principal circuit of a facsimile apparatus according to an embodiment of the present invention.
FIG. 3 is a diagram illustrating a communication format for an embodiment of the present invention.

FIG. 2 is a block diagram showing the hardware configuration of a black-and-white or color facsimile apparatus according to an embodiment of the present invention.

Referring to the drawing, MPU (microprocessing unit) 1 controls the entire apparatus.

ROM (read only memory) 2 stores a command set of the MPU 1 beforehand.

RAM (random access memory) 3 serves as a work area for the MPU 1 and allows reading and writing of various items of data.

SCU (scanner control unit) 4 inputs images, and PCU (printer control unit) 5 outputs images.

CCU (communication control unit) 6 controls the transmission and reception of image data, and DU 7 is an external memory device consisting of a floppy disk, a hard disk or the like.

MU (memory unit) 8 operates as a buffer for an input/output device; CU 9 is a device for facsimile coding/decoding; and OPU 10 is an operating device which enables the operator to input various items of data and presents various displays to the operator.

FIG. 3 shows a "nonstandard capability" (hereinafter referred to as "NSC") format in conformity with the Group 4 facsimile protocols of CITT.

In FIG. 3, field 1 (F1) consists of "parameter group identifiers" (hereinafter referred to as "PGI"); field 2 F(2) consists of "length indicators" (hereinafter referred to as "LI"); and field 3 (F3) and field 6 (F6) respectively consist of "parameter identifiers" (hereinafter referred to as "PI").

F4 (field 4) consists of the same LI as those of F2; and field 5 (F5) and field 7 (F7) consist of "parameter values" (hereinafter referred to as "PI")

A communication method according to this embodiment, constructed as described above, will be described with reference to FIG. 4.

Figure 4:
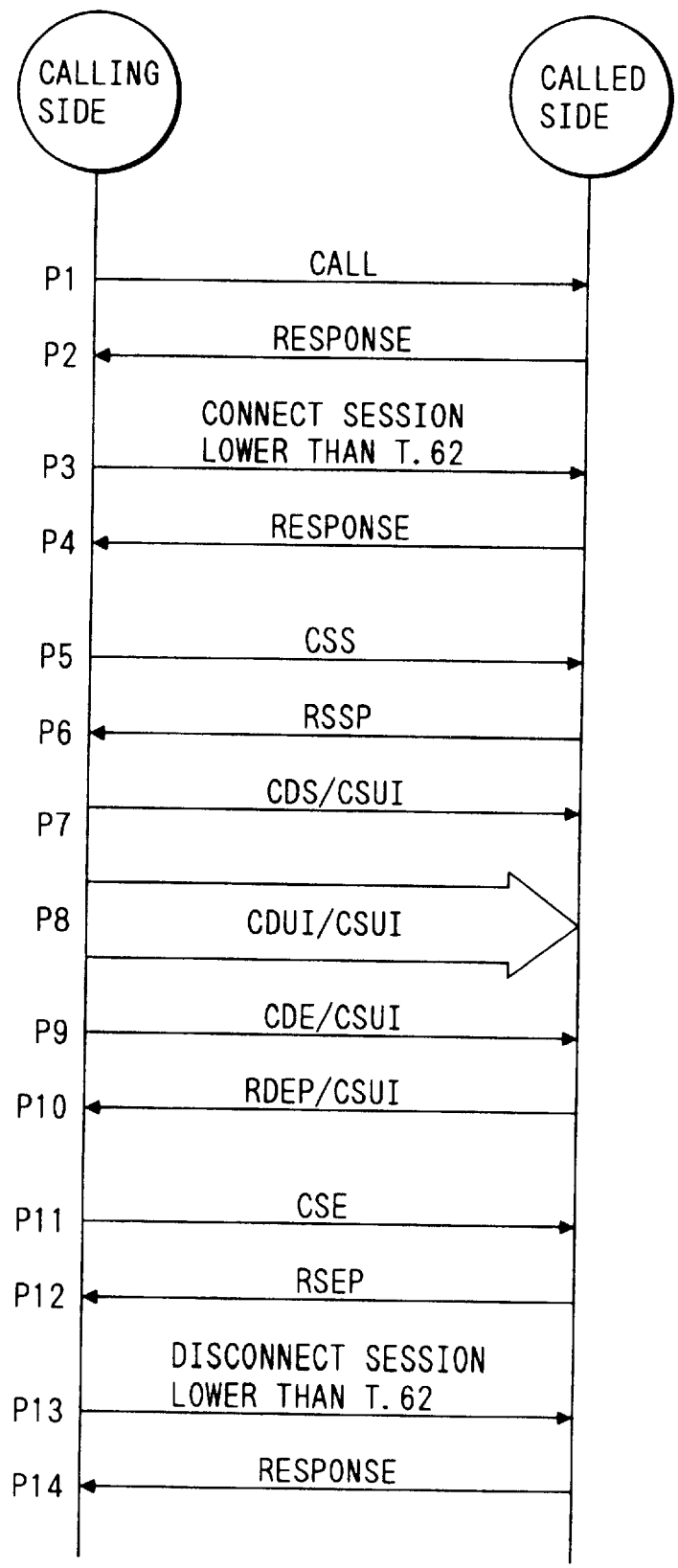
FIG. 4 is a diagram illustrating a protocol sequence in an embodiment of the present invention.

FIG. 4 is a protocol sequence chart showing the protocols used when a color facsimile apparatus receives information transmitted from a monochrome facsimile apparatus.

First, in protocol 1 (P1), the monochrome facsimile apparatus, (the calling terminal) calls the color facsimile apparatus (the called terminal).

When the call is responded to in protocol 2 (P2), a session lower than "T.62" is connected, and a response is received in protocol 4 (P4). In protocol 5 (P5), a command for session start, "CSS", is transmitted.

The NSC section of this "CSS" stores: color characteristics as the PGI of F1; designation of a color corresponding to black information as the PI of F3; and specific reproduction colors as the PV of F5. Further, it stores designation of a color corresponding to white information as the PI of F6, and specific reproduction colors as the PV of F8.

Regarding the colors to be designated, they are input to the calling-side facsimile apparatus beforehand by the operator through key operations at the OPU 10.

In protocol 6 (P6), a session positive response "RSSP" is received.

when the called-side apparatus is a color facsimile apparatus which is capable of reproducing in at least black or white as designated by the calling-side Group 4 facsimile apparatus, this "RSSP" is one having the same NSC section as that of the "CSS".

If the called-side color facsimile apparatus is incapable of reproduction in the designated colors, all the reproduction colors that allow reproduction by the color facsimile apparatus are returned.

The MPU 1 of the calling-side facsimile apparatus stores in RAM 3 the reproduction color information returned from the CCU 6, and displays, through the OPU 10, information on the colors which allow designation, as a message to the operator. When it is possible to input reproduction colors corresponding to black/white, the procedure advances to the next protocol.

When the reproduction color input is impossible, the operator is requested, through a message display, to designate other reproduction colors, and the procedure returns to the initial protocol.

In protocol 7 (P7), a command for document start, "CDS", is transmitted as an invocation resulting from negotiations in P5 and P6. A format having the same contents as that transferred by the NSC in P5 and P6 is used as the reproduction color invocation means.

In protocol 8 (P8), MMR coding data is transmitted as a Group 4 facsimile image through a document user information command "CDUI".

When the transmission of the image MMR coding data has been terminated, the procedure advances to protocol 9 (P9), where a document end command "CDE" is transmitted, and, in protocol 10 (P10), a document end positive response "RDEP" is received. In protocol 11 (P11), a session end command "CSE" is transmitted, and, in protocol 12 (P12), a session end positive response "RSEP" is received.

In protocol 13 (P13), session lower than T.62 is disconnected, and, in protocol 14 (P14), a response is received and the call is completely disconnected.

When, in P6, the protocol operation is conducted solely in accordance with the Group 4 facsimile standards devoid of NSC, only black-and-white two-valued data itself is transmitted in accordance with the standards for Group 4 facsimile apparatuses.

Next, a circuit operation for executing the image communication method described above will be explained.

The circuit configuration of the facsimile apparatus for transmitting two-valued images and that of the facsimile apparatus for reproducing and outputting the received images may be substantially the same as the circuit configuration shown in FIG. 2. However, the procedures executed by MPU 1 are different from those in the prior art. Thus, an explanation in this connection will be given with reference to FIGS. 5 through 8.

Figure 5:
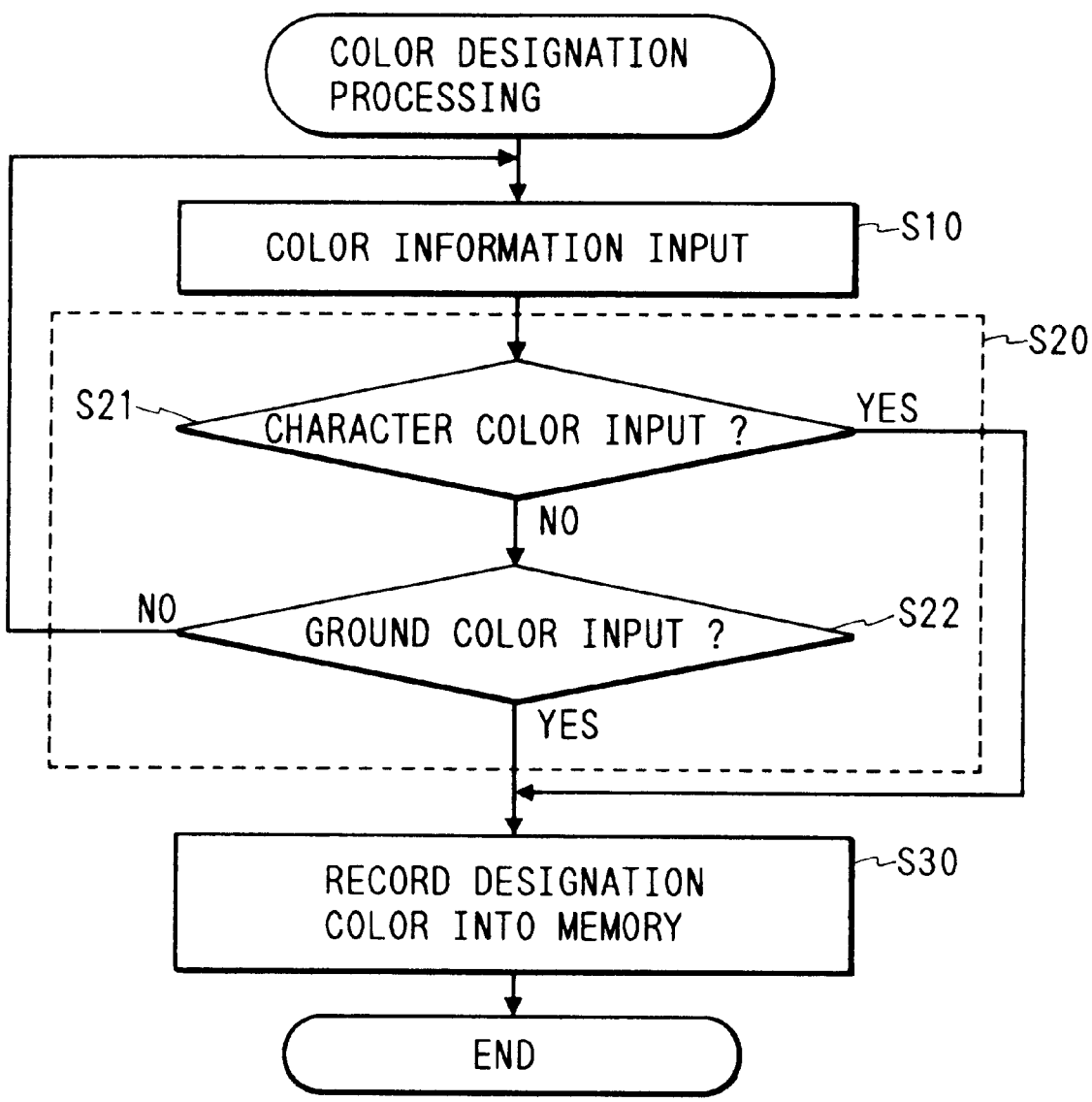
FIG. 5 is a flowchart illustrating reproduction color designation procedures to be executed by a transmission-side facsimile apparatus (for two-valued image data) according to a first embodiment of the present invention.

FIG. 5 shows the procedures for designating the colors of transmitted images in the facsimile apparatus on the transmission side.

Referring to FIG. 5, when a two-valued image is transmitted, the operator enters the image to be reproduced and output and a plain color code by the ten key, etc. of the OPU 10 (Step 10 of FIG. 5). The OPU 10 at this time operates as indication means.

The MPU 2 of the transmission-side facsimile apparatus compares the input color code with various standard color codes, thereby discriminating the color designated through the color code (Step S20 of FIG. 5). The discrimination results are converted by MPU 1 into communication format information in conformity with the protocols mentioned above, and then temporarily recorded in RAM 3 as reproduction color designation information (Step S30 of FIG. 5). In FIG. 5, step S21 is for character color input and step S22 is for discrimination of ground color input. That is, in this embodiment, character color and ground color can be separately designated and transmitted.

Figure 6:
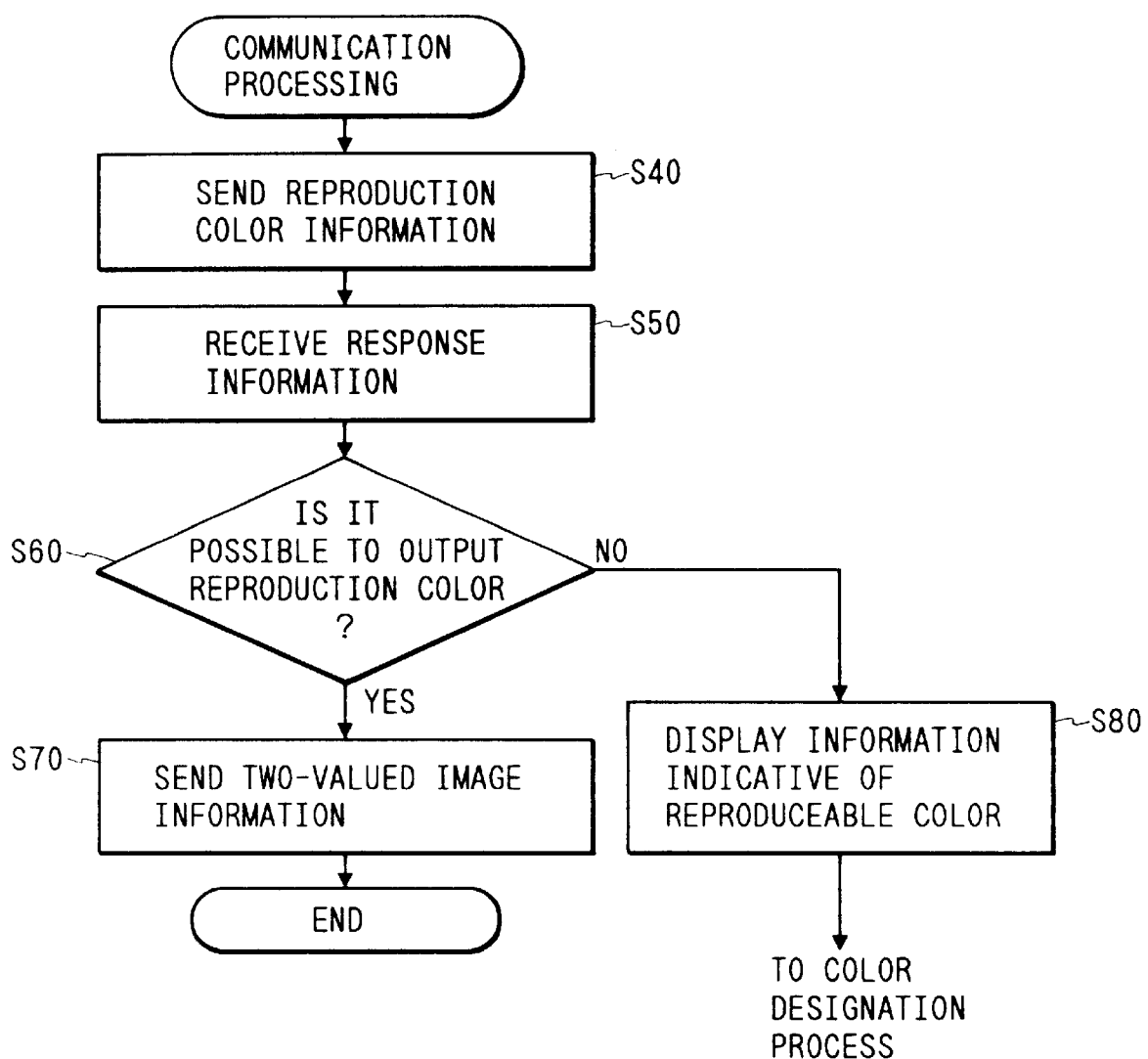
FIG. 6 is a flowchart illustrating image data transmission procedures to be executed by a transmission-side facsimile apparatus (for two-valued image data) according to the first embodiment of the present invention.

Next, the MPU 1 of the transmission-side facsimile apparatus executes the control procedures of FIG. 6 and, in accordance with the protocols, transmits RAM 39 reproduction color information to the reception-side facsimile apparatus (step S40 of FIG. 6).

The reception-side (color facsimile apparatus gives a response, in accordance with the control procedures of FIG. 7 (described below), as to whether reproduction is possible in conformity with the reproduction color designation information. That is, it makes a judgment, in step S130 of FIG. 7, as to whether the reproduction color designation information is executable. If it is executable, a "reproducible" response is output and, at the same time, the reproducible designated color is stored in the memory (S135). If it is not executable, table information described below is given as a response (S140). Accordingly, the MPU 1 of the transmission-side facsimile apparatus receives response reproducibility information and, by comparing it with prescribed codes, makes a judgment as to reproducibility (step S60 of FIG. 6).

In the case where the reproduction is possible, the two-valued image data to be reproduced, which has been stored beforehand in RAM 3, is read out and transmitted to the reception-side facsimile apparatus in accordance with the above protocols (step S70 of FIG. 6).

Thus, MPU 1, which performs communication control for transmitting reproduction color designation information and two-valued image data, operates as the communication control means of this embodiment, and CCU 6, MU 8 and CU 9, which perform communication of these items of data, operates as the communication means of the present invention.

Figure 7:
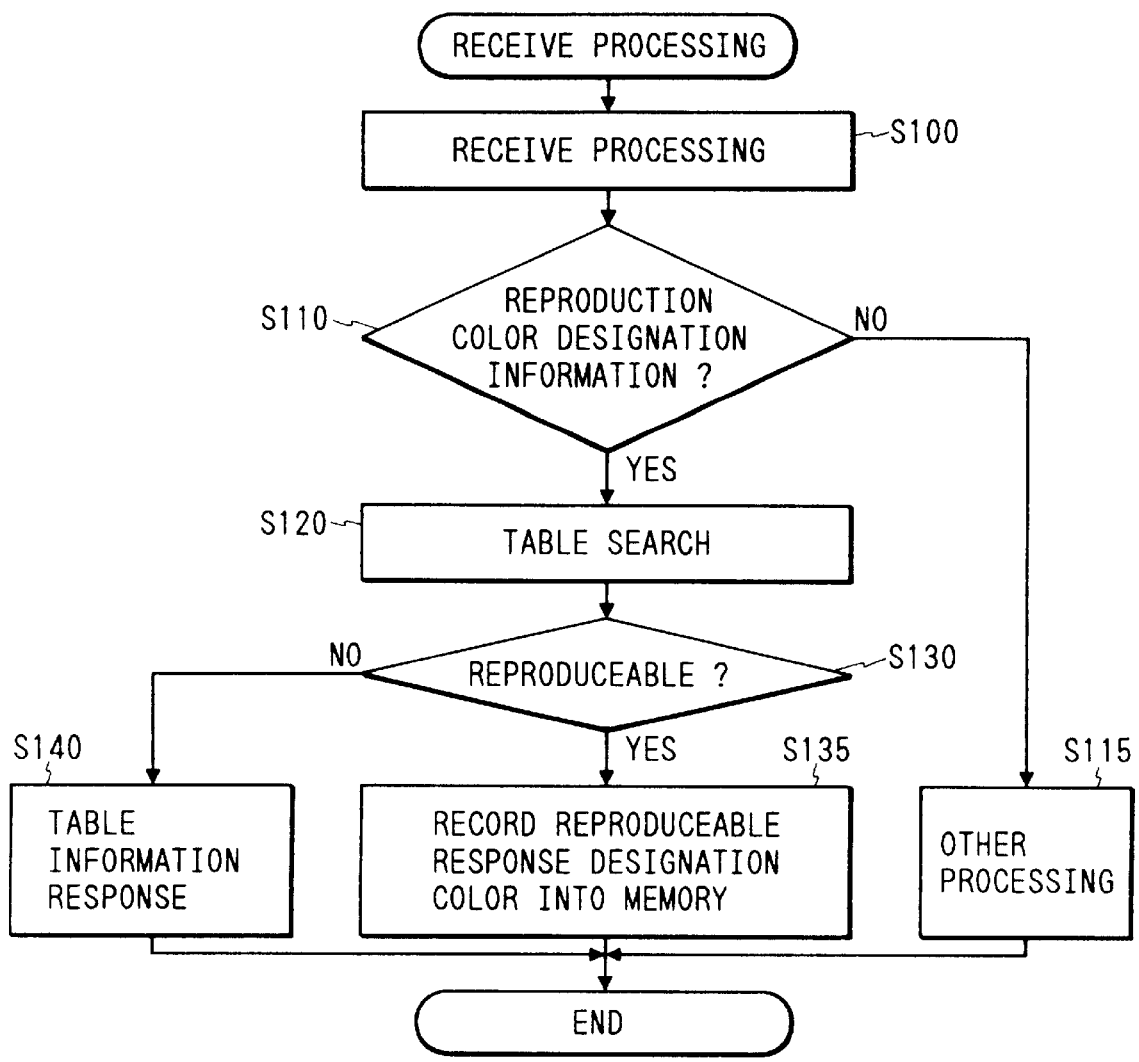
FIG. 7 is a flowchart illustrating response procedures to be executed by a reception-side facsimile apparatus (for two-valued image data) according to the first embodiment of the present invention.

If, on the other hand, the reproducibility information given as a response from the receptionside facsimile apparatus indicates irreproducibility, it is detected through the judgment procedure in step S60 of FIG. 6, and the MPU 1 of the transmission-side facsimile apparatus displays, through the display section of the OPU 10, the reproducible-color codes of the reception-side facsimile apparatus received with the reproducibility information transmitted in step S140 of FIG. 7, which will be described below (step S80 of FIG. 6).

After that, the MPU 1 of the transmissionside facsimile apparatus returns to the start procedure of FIG. 5, and executes the reproduction color designation process again.

The operation of the reception-side facsimile apparatus in the above communication (negotiation) between the transmission-side and reception-side facsimile apparatuses will be described.

When it receives the reproduction color designation information, transmitted from the transmission-side facsimile apparatus (step S100 of FIG. 7), the reception-side facsimile apparatus confirms by discrimination by format codes, that the received information is reproduction color designation information, and then makes, in the next step, a judgment as to whether reproduction and output in the designated color is possible or not (step S110 of FIG. 7).

In this embodiment, reproducible colors are registered, as color codes in the form of a table, in the ROM 2 of the reception-side facsimile apparatus.

The reception-side facsimile apparatus searches this table so as to make a judgment on reproducibility in accordance with whether the table contains a color code that is the same as the designated reproduction color received.

When the judgment result is "reproducible", the received information on the designated reproduction color is temporarily stored in RAM 3, and response information is sent to the transmissionside facsimile apparatus to the effect that reproduction is possible (step S130 → step S135 of FIG. 7).

When the judgment result is "irreproducible", those registered color codes which are reproducible are sent as a response to the transmission-side facsimile apparatus, along with response information to the effect that reproduction is not possible (step S130 → step S140 of FIG. 7).

After that, the image data transmitted from the transmission-side facsimile apparatus is, as in the prior art, temporarily stored in the RAM 3 of the reception-side facsimile apparatus through the procedures: step S100 → step S110 → step S115. Then, the MPU 3 of the reception-side facsimile apparatus executes image processing for image reproduction through control procedures of FIG. 8.

That is, upon code-discrimination of the color indicated by the reproduction color designation information stored in RAM 3, the received two-valued image data is converted into multi-valued image data for full-color output reproduction (recording) (step S200 → step S210 of FIG. 8).

The MPU 3 of the reception-side facsimile apparatus at this time operates as discrimination means and image processing means.

The image data which has been thus converted into multi-valued image data is reproduced and output on recording paper by PCU 5 and a printer.

Apart from the above-described embodiments, the following modifications are possible;

1) While the above embodiment uses the protocols for Group 4 facsimile apparatuses, as recommended by CCITT, the present invention can also be executed by using other protocols which allow negotiation and invocation of reproduction colors. Further, though MMR is used as the image coding data in the above-described embodiment, the present invention is also applicable to other types of coding data, such as MR or MH, or raw data.

2) While in the above embodiment negotiation is conducted between the transmission-side and reception-side facsimile apparatuses with respect to reproducible colors, it is also possible, when it is desired to shorten the communication time, to transmit reproduction color designation information and image data at the same time without performing any negotiation. The MPU 3 of the reception-side facsimile apparatus makes a judgment as to whether reproduction is possible in the designated color, on the basis of the received reproduction color designation information. When reproduction in the designated color is impossible, image reproduction/output is effected in predetermined colors, for example, black and white.

3) When transmitting a particular original image, it is possible to determine the designated color beforehand and to register for storage reproduction color designation information in a non-volatile memory, such as ROM 2, provided inside the transmission-side facsimile apparatus. In that case, the non-volatile memory functions as the designation means of the present invention.

As described above, this embodiment enables the reception-side facsimile apparatus to perform color reproduction of an image pattern in colors other than black and white, which has been impossible with the prior-art systems.

Next, the second embodiment of the present invention will be described.

In accordance with the second embodiment, there is disclosed a technique with which, in transmitting two-valued image data, the color of a range as specified by the data is designated, and exclusively this color-designated range is colored.

The second embodiment will be described with reference to FIGS. 9 through 12.

In the second embodiment, color characteristics are stored in the NSC section shown in FIG. 3 as the PGI of F1; data corresponding to range designation information is stored as the PI of F3; specific range designation information is stored as the PV of F5. Likewise, designation of data corresponding to color information is stored as the PI of F6, and specific reproduction colors are stored as the PV of F8.

The range and color to be designated are entered beforehand in the transmission-side facsimile apparatus through key operation by the operator.

In protocol 6 (F6), a session positive response "RSSP" is received.

Here, assuming that the apparatus on the called-side is a color facsimile apparatus which is capable of printing a range-designated portion in a designated color by using range designation information and reproduction color information as designated by the transmission-side Group 4 facsimile apparatus, an "RSSP" having an NSC section which is the same as that of "CSS" is returned.

FIG. 9 shows the procedures for conducting color designation and range designation on a transmitted image in the transmission-side facsimile apparatus.

Referring to FIG. 9, when transmitting a two-valued image, the operator enters, through OPU 10, an image range whose color is to be designated and the color code of the desired color (steps S1 and S2 of FIG. 9). The OPU 10 at this time operates as the designation means of this embodiment.

The MPU 2 of the transmission-side facsimile apparatus compares the input color code with various standard color codes, thereby discriminating the color designated through the color code (step S3 of FIG. 9). The results of this discrimination are converted by MPU 1 into information for a communication format in conformity with the above protocols, and then temporarily stored in RAM 3 as reproduction color designation information and range designation information (step S4 of FIG. 9).

Figure 10:
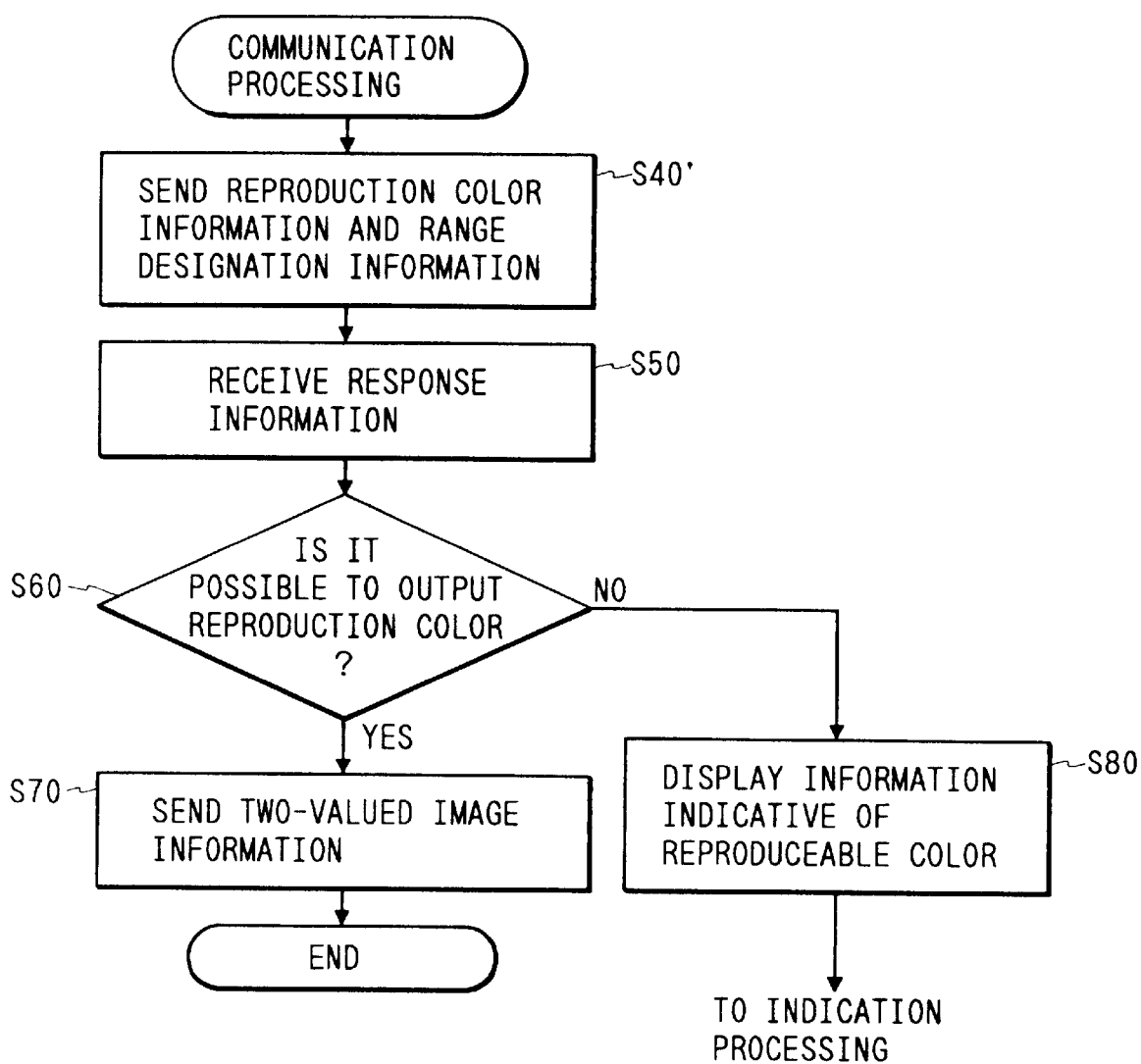
FIG. 10 is a flowchart illustrating image data transmission procedures to be executed by a transmission-side facsimile apparatus (for two-valued image data) according to the second embodiment of the present invention.
Figure 14:
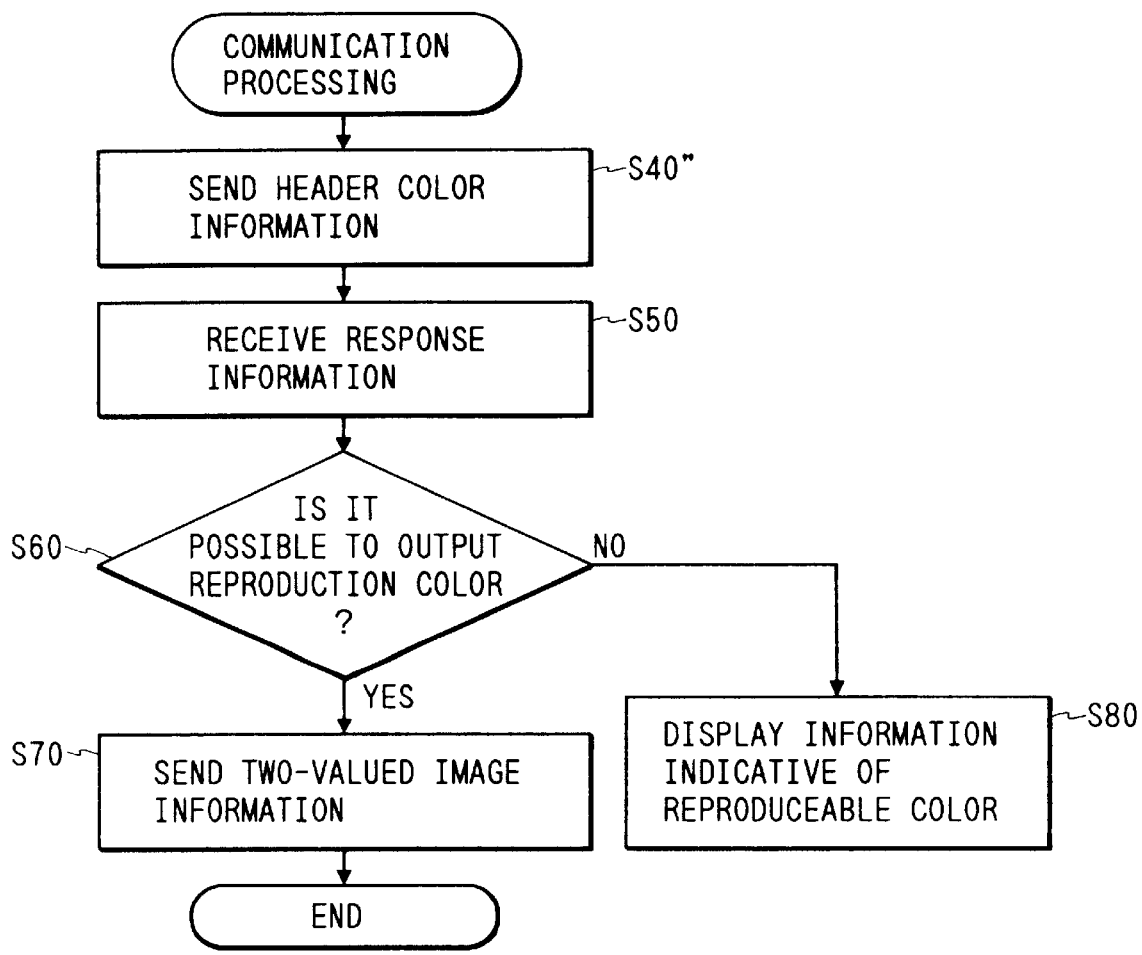
FIG. 14 is a flowchart illustrating image data transmission procedures to be executed by a transmission-side facsimile apparatus (for two-valued image data) according to the third embodiment of the present invention.
Figure 16:
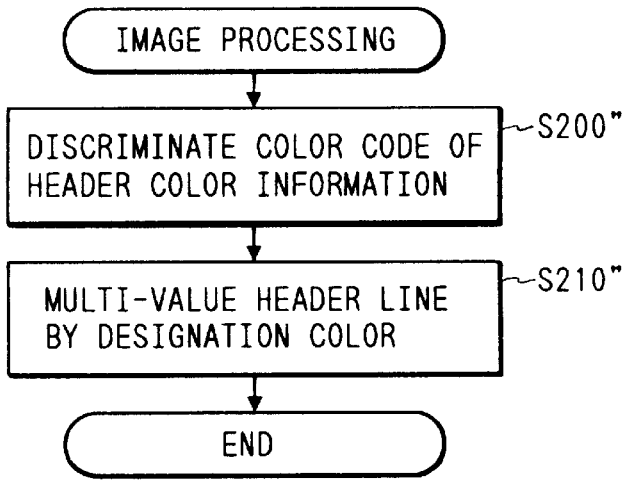
FIG. 16 is a flowchart illustrating image processing procedures to be executed by a reception-side facsimile apparatus (for two-valued image data) according to the third embodiment of the present invention.
Figure 15:
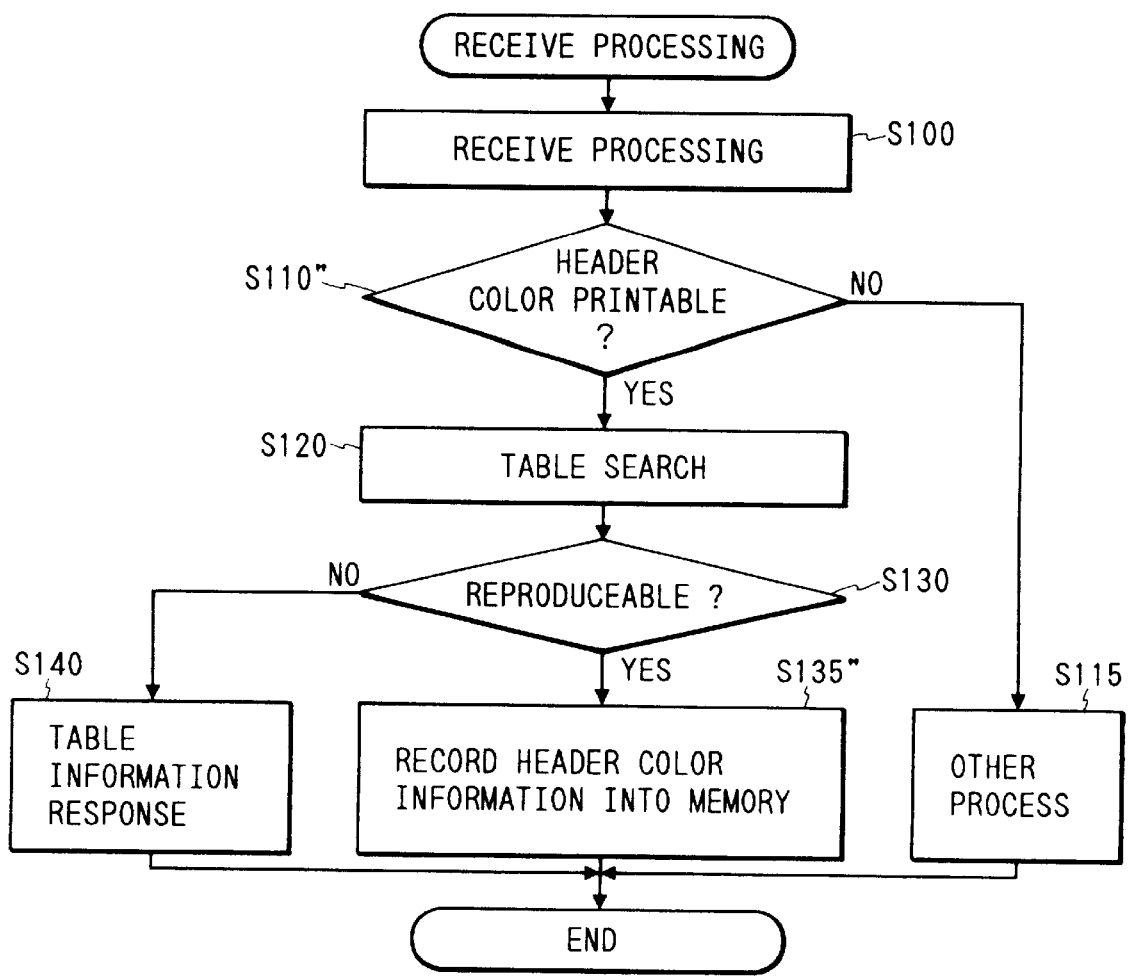
FIG. 15 is a flowchart illustrating response procedures to be executed by a reception-side facsimile apparatus (for two-valued image data) according to the third embodiment of the present invention.

Next, the MPU 1 of the transmission-side facsimile apparatus executes the control procedures of FIG. 10, and transmits, in accordance with the protocols, the reproduction color designation information and range designation information of RAM 3 to the reception-side facsimile apparatus (step S40' of FIG. 10).

FIGS. 10 through 12 are flowchart similar to those of FIGS. 6 through 8. FIG. 10 is featured by step S40', in which not only reproduction color information, but also information on the range to be reproduced in the reproduction color, are transmitted.

FIG. 11 is featured by step S135', where a "reproducible" response indication color and range designation information are transmitted.

In step S200' of FIG. 12, not only the designation color of reproduction color designation information, but also the designation range of range designation information, are discriminated, and, in step S210', the two-valued image of the range specified by the designation information is multi-valued for each of the designated color components and output.

Apart from the above, the procedures of FIGS. 10 through 12 are the same as those of the flowcharts of FIGS. 6 through 8.

As described above, the second embodiment provides the following advantage: The data communicated between conventional facsimile apparatuses has been two-valued image data, that is, it has been only black/white discrimination information, whereas, in accordance with the second embodiment, range designation information and reproduction color information are added to the two-valued image data before transmitting the same, thereby making it possible for the reception-side color facsimile apparatus to print a designated range of the two-valued image data in a designated color.

Although the above embodiments have been described as applied to the transmission of two-valued data, this should not be construed restrictively. They are also applicable to the transmission of multi-valued data.

Next, the third embodiment of the present invention will be described. In accordance with the third embodiment, there is disclosed a technique for transmitting color designation information for a header provided at the head of each page in transmission from a monochrome facsimile apparatus to a color facsimile apparatus.

FIGS. 13 through 16 respectively correspond to the flowcharts of FIGS. 5 through 8. In this embodiment, there is first input, in step S10" of FIG. 14, data on the color to be imparted to the header, and, in step S40" of FIG. 14, header color information is transmitted. In step S110" of FIG. 15, a judgment is made as to whether the header color information is printable. In step S200" of FIG. 16, the color code of the header color information is discriminated, and, in step S210", the header line is multi-valued and printed in the designated color. A "header" represents transmitter information or destination designating information generally adopted in facsimile apparatuses, which information is generated as dot data by the MPU 1 shown in FIG. 2.

Regarding the above header color information, the following data allocation is effected: data indicating the presence of header color information is allocated to the Pi of F3, described with reference to the first embodiment; information specifying the header color is allocated to the PV of F5; data indicating the presence of a color corresponding to the white background is allocated to the Pi of F6; and information specifying the color corresponding to the white background is allocated to the PV of F8. Apart from the above, the procedures of this embodiment are the same as those of the flowcharts of FIGS. 5 through 8, so a description thereof will be omitted.

As described above, this embodiment provides the following advantage: The data which has been transmitted and received between the conventional facsimile apparatus has been two-valued data, so it has only been possible to send black/white discrimination data, whereas, in this embodiment, data on header color information is added to the two-valued image data, thereby making it possible to print the header line of the reception-side facsimile apparatus in a color arbitrarily designated on the transmission side.

Further, it is also possible to combine the first to third embodiments of the present invention to form a monochrome facsimile apparatus which is capable of transmitting header coloring information with respect to a transmitted monochrome image, range information indicating a range to be colored, and color information on the color in which that range is to be colored. In that case, the amount of information allocated by the above-described NSC section is augmented. Further, the above-described facsimile apparatus may be an apparatus for transmitting two-valued data or one for transmitting multi-valued data.

What is claimed is:

1. An image communication apparatus comprising:

transmitting means for transmitting image data and an inquiry signal for inquiring as to reproducible colors at a receiving side, the inquiry signal being a color-indicative signal;

receiving means for receiving an answer signal for the inquiry signal transmitted by said transmitting means; and control means for causing predetermined display means to display a color that is reproducible at the receiving side on the basis of the answer signal, where the answer signal indicates the color and is received by said control means when a color indicated by the color-indicative signal cannot be reproduced at the receiving side, wherein the transmitting by said transmitting means is executed using a standardized protocol, and wherein the inquiry signal is a non-standard feature in the protocol.

2. An image communication method comprising the steps of:

transmitting image data and an inquiry signal for inquiring at to reproducible colors at a receiving side, the inquiry signal being a color-indicative signal;

receiving an answer signal for the inquiry signal transmitted in said transmitting step; and causing predetermined display means to display a color that is reproducible at the receiving side on the basis of the answer signal when a color indicated by the color-indicative signal cannot be reproduced at the receiving side, wherein the transmitting in said transmitting step is executed using a standardized protocol, and wherein the inquiry signal is a non-standard feature in the protocol.

3. An image communication apparatus having predetermined color image output means, comprising:

storing means for storing color data indicative of colors which are outputtable by said color image output means, as a table;

receiving means for receiving from a transmitting side, image data and output color information;

retrieving means for retrieving the color data from the table by using the output color information received by said receiving means; and answer means for answering the transmitting side by transmitting the color data in the table when there is no color data corresponding to the output color information, wherein the receiving by said receiving means is executed using a standardized protocol, and wherein the output color information is a non-standard feature in the protocol.

4. An apparatus according to claim 3, wherein said retrieving means retrieves whether or not there is color data corresponding to the output color information in the table.

5. An apparatus according to claim 4, wherein the answering by said answer means is to transmit the color data in the table when there is no color data corresponding the output color information in retrieving by said retrieving means.

6. An apparatus according to claim 3, wherein the answering by said answer means is performed by using predetermined display means present in the transmitting side.

7. An image communication apparatus having predetermined color output means, comprising:

storing means for storing color data indicative of colors which are outputtable by said color image output means, as a table;

receiving means for receiving from a transmitting side, image data and inquiry information for inquiring at to outputtable colors, the inquiry information being output color information; and answer means for answering the transmitting side when there is no color data in the table corresponding to the received output color information, wherein the receiving by said receiving means is executed using a standardized protocol, and wherein the inquiry information is a non-standard feature in the protocol.

8. An apparatus according to claim 7, wherein the answering by said answer means is performed by transmitting the color data in the table to the transmitting side.

9. An apparatus according to claim 7, wherein the answering by said answer means is performed by using predetermined display means present in the transmitting side.

10. An image communication method in which predetermined color image output means is controllable, comprising:

storing color data indicative of colors which are outputtable by said color image output means, as a table;

receiving from a transmitting side, image data and inquiry information for inquiring as to outputtable colors, the inquiry information being output color information; and answering the transmitting side when there is no color data in the table corresponding the received output color information, wherein the receiving in said receiving step is executed using a standardized protocol, and wherein the inquiry information is a non-standard feature in the protocol.

11. A image communication apparatus comprising:

transmitting means for transmitting image data and color information for outputting by a partner apparatus an image represented by the image data;

receiving means for receiving color data indicative of colors which the partner apparatus is capable of outputting the image when the partner apparatus cannot output the image using the color information transmitted by said transmitting means, wherein receiving the color data indicative of colors in which the partner apparatus is capable of outputting the image is not performed by said receiving means when the partner apparatus can output the image using the color information transmitted by said transmitting means, wherein the transmitting by said transmitting means is executed using a standardized protocol, and wherein the color information is a non-standard feature in the protocol.

12. An apparatus according to claim 11, further comprising display means for displaying the color data received by said receiving means.

13. An apparatus according to claim 12, wherein a transmission by said transmitting means is performed again on the basis of the display by said display means.

14. An apparatus according to claim 11, wherein a transmission by said transmitting means and a reception by said receiving means are performed through an ISDN line.

15. An apparatus according to claim 11, wherein a transmission by said transmitting means and a reception by said receiving means is performed by using protocols of Group 4 facsimile apparatus.

16. An apparatus according to claim 11, wherein said transmitting means further transmits image area information indicative of an image area in which the color information is used.

17. A image communication method comprising the steps of:
  transmitting image data and color information for outputting by a partner apparatus an image represented by the image data; and
  receiving color data indicative of colors in which the partner apparatus is capable of outputting the image when the partner apparatus cannot output the image using the transmitted color information,
  wherein the color data indicative of colors in which the partner apparatus is capable of outputting the image is not received when the partner apparatus can output the image using the transmitted color information,
  wherein the transmitting in said transmitting step is executed using a standardized protocol, and wherein the color information is a non-standard feature in the protocol.

18. An image communication apparatus having predetermined color image output means, comprising:
  receiving means for receiving image data and image output color information from a communication partner side; and
  transmitting means for transmitting color data indicative of colors outputtable by said color image output means to the communication partner side in accordance with the image output color information,
  where transmitting of the color data is performed by said transmitting means when said predetermined color image output means cannot output colors indicated by the image output color information, and transmitting of the color data is not performed by the transmitting means when said predetermined color image output means can output the colors indicated by the image output color information,
  wherein the receiving by said receiving means is executed using a standardized protocol, and wherein the image output color information is a non-standard feature in the protocol.

19. An apparatus according to claim 18, wherein said receiving means can receive image information and the image output color information indicative of colors used when the image information is output.

20. An apparatus according to claim 18, wherein a transmission by said transmitting means and a reception by said receiving means are performed through an ISDN line.

21. An apparatus according to claim 18, wherein a transmission by said transmitting means and a reception by said receiving means is performed by using protocols of Group 4 facsimile apparatus.

22. An apparatus according to claim 18, wherein said receiving means further receives information of an image area in which the image output color information is used.

23. An image communication method in which predetermined color image output means is controlled, comprising the steps of:
  receiving image data and image output color information from a communication partner side; and
  transmitting color data indicative of colors outputtable by said color image output means to the communication partner side in accordance with the image output color information,
  where transmitting of the color data is performed when said predetermined color image output means cannot output colors indicated by the image output color information, and transmitting of the color data is not performed when said predetermined color image output means can output the colors indicated by the image output color information,
  wherein the receiving in said receiving step is executed using a standardized protocol, and wherein the image output color information is a non-standard feature in the protocol.

24. A facsimile image communication apparatus including receiving means for receiving image data and a color designating information signal which is utilized to reproduce the image data as a visible image by said image communication apparatus, said apparatus comprising:
  deciding means for deciding whether or not the image data is reproducible as a visible image by using a color indicated by the color designating information signal on the basis of the color designating information signal and information of a reproducible color stored in predetermined storage means; and
  transmitting means for transmitting, to a transmitting side, a signal indicating whether or not the image data is reproducible by the color indicated by the color designating information signal, in response to a result decided by said deciding means,
  wherein the receiving by said receiving means is executed using a standardized protocol, and wherein the color designating information signal is a non-standard feature in the protocol.

25. An apparatus according to claim 24, wherein said transmitting means transmits information indicated a color which is reproducible by said image communication apparatus when it is decided by said deciding means that the image data is not reproducible.

26. An apparatus according to claim 24, wherein said predetermined storage means is a table in which a color which is reproducible by said image communication apparatus is stored.

27. A method of controlling the reproduction of facsimile images in color comprising the steps of:
  storing in a receiving apparatus codes representing the colors in which images can be reproduced;
  receiving image data and a color designating information signal;
  comparing the received signal with the stored codes to determine whether the image data can be reproduced in the indicated color; and
  sending a signal to the transmitter indicating the result of the comparisons
  wherein the receiving by said receiving step is executed using a standardized protocol, and wherein the color designating information signal is a non-standard feature in the protocol.

28. An image communication method in which predetermined color image output means is controllable, comprising the steps of:
  storing color data indicative of colors which are outputtable by said color image output means, as a table;
  receiving from a transmitting side, image data and output color information;

retrieving the color data from the table by using the output color information received in said receiving step; and answering the transmitting side in response to a result retrieved in said retrieving step by transmitting the color data in the table when there is no color data corresponding to the output color information, wherein the receiving in said receiving step is executed using a standardized protocol, and wherein the output color information is a non-standard feature in the protocol.

* * * * *

UNITED STATES PATENT AND TRADEMARK OFFICE
CERTIFICATE OF CORRECTION

PATENT NO. : 5,898,504

DATED : April 27, 1999

INVENTOR(S): NAOYUKI OKADA, ET AL.　　　　　　　Page 1 of 4

It is certified that error appears in the above-identified patent and that said Letters Patent is hereby corrected as shown below:

Title page,

AT [56] REFERENCES CITED

FOREIGN PATENT DOCUMENTS

"2100573" should read --2-100573--.

IN THE DRAWINGS

Sheet 5, FIG. 6, "REPRODUCEABLE" should read --REPRODUCIBLE--;
Sheet 6, FIG. 7, "REPRODUCEABLE" should read --REPRODUCIBLE-- (both occurrences);
Sheet 8, FIG. 10, "REPRODUCEABLE" should read --REPRODUCIBLE--;
Sheet 9, FIG. 11, "REPRODUCEABLE" should read --REPRODUCIBLE-- (both occurrences);
Sheet 11, FIG. 14, "REPRODUCEABLE" should read --REPRODUCIBLE--; and
Sheet 12, FIG. 15, "REPRODUCEABLE" should read --REPRODUCIBLE--.

COLUMN 1

Line 57, "other" should read --Other--.

UNITED STATES PATENT AND TRADEMARK OFFICE
CERTIFICATE OF CORRECTION

PATENT NO. : 5,898,504

DATED : April 27, 1999

INVENTOR(S): NAOYUKI OKADA, ET AL.                    Page 2 of 4

It is certified that error appears in the above-identified patent and that said Letters Patent is hereby corrected as shown below:

COLUMN 3

Line 39, "CITT." should read --CCITT.--; and
    Line 47, ""PI)" should read --"PV").--.

COLUMN 4

Line 6, "when" should read --When--.

COLUMN 5

Line 31, "sionside" should read --sion-side--;
    Line 44, "operates" should read --operate--;
    Line 47, "receptionside" should read --reception-side--; and
    Line 56, "transmissionside" should read --transmission-side--.

COLUMN 6

Line 15, "transmissionside" should read --transmission-side--.

UNITED STATES PATENT AND TRADEMARK OFFICE
CERTIFICATE OF CORRECTION

PATENT NO. : 5,898,504

DATED      : April 27, 1999

INVENTOR(S): NAOYUKI OKADA, ET AL.

It is certified that error appears in the above-identified patent and that said Letters Patent is hereby corrected as shown below:

<u>COLUMN 7</u>

Line 60, "flowchart" should read --flowcharts--.

<u>COLUMN 9</u>

Line 6, "Further," should read --¶Further,--; and
   Line 33, "at to" should read --as to--.

<u>COLUMN 10</u>

Line 3, "corresponding" should read --corresponding to--;
   Line 13, "at to" should read --as to--;
   Line 37, "corresponding" should read
           --corresponding to--; and
   Line 42, "A" should read --An--.

<u>COLUMN 11</u>

Line 11, "A" should read --An--.

UNITED STATES PATENT AND TRADEMARK OFFICE
CERTIFICATE OF CORRECTION

PATENT NO. : 5,898,504

DATED : April 27, 1999

INVENTOR(S): NAOYUKI OKADA, ET AL.

It is certified that error appears in the above-identified patent and that said Letters Patent is hereby corrected as shown below:

<u>COLUMN 12</u>

```
Line 37, "indicated" should read --indicating--; and
Line 56, "comparisons" should read --comparison,--.
```

Signed and Sealed this

Fourteenth Day of March, 2000

Attest:

Q. TODD DICKINSON

*Attesting Officer*   *Commissioner of Patents and Trademarks*